United States Patent
Mizusawa

(10) Patent No.: US 8,077,616 B2
(45) Date of Patent: Dec. 13, 2011

(54) DATA TRANSMISSION APPARATUS AND DATA TRANSMISSION METHOD

(75) Inventor: Yoshiki Mizusawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 289 days.

(21) Appl. No.: 11/892,803

(22) Filed: Aug. 27, 2007

(65) Prior Publication Data

US 2008/0123675 A1     May 29, 2008

(30) Foreign Application Priority Data

Nov. 29, 2006    (JP) ................................ 2006-321777

(51) Int. Cl.
*G01R 31/08* (2006.01)
*G06F 11/00* (2006.01)
*G06F 15/173* (2006.01)
*G06F 9/26* (2006.01)
*H04J 3/14* (2006.01)
*H04L 12/28* (2006.01)
*H04L 12/56* (2006.01)
*H04L 12/54* (2006.01)

(52) U.S. Cl. ........ 370/231; 370/235; 370/248; 370/392; 370/412; 370/428; 709/224; 709/238; 711/221

(58) Field of Classification Search .................. 709/223, 709/224, 238; 370/231–235, 248, 252, 389, 370/392, 412–418, 428; 711/221
See application file for complete search history.

(56) References Cited

U.S. PATENT DOCUMENTS

| | | | | |
|---|---|---|---|---|
| 6,016,308 | A  * | 1/2000 | Crayford et al. | 370/252 |
| 6,151,316 | A  * | 11/2000 | Crayford et al. | 370/356 |
| 7,215,637 | B1 * | 5/2007 | Ferguson et al. | 370/230.1 |
| 2002/0035628 | A1 * | 3/2002 | Gil et al. | 709/224 |
| 2003/0214913 | A1 * | 11/2003 | Kan et al. | 370/252 |
| 2005/0138204 | A1 * | 6/2005 | Iyer et al. | 709/242 |
| 2008/0106603 | A1 * | 5/2008 | Whitehead et al. | 348/207.1 |

FOREIGN PATENT DOCUMENTS

| | | |
|---|---|---|
| JP | 2002-164924 | 6/2002 |
| JP | 2004-159122 | 6/2004 |

* cited by examiner

*Primary Examiner* — Alpus H Hsu
*Assistant Examiner* — Jeremy Costin
(74) *Attorney, Agent, or Firm* — Staas & Halsey LLP

(57) ABSTRACT

In a data transmission apparatus, provisions are made to be able to trace the result of processing or discarding of a specific packet from outside the apparatus. More specifically, in a data transmission apparatus that receives data having a header and, based on information carried in the header, performs processing such as destination determination, discard processing, and priority transmission processing on the received data by using a plurality of processing blocks, a memory for storing the processing results supplied from the respective processing blocks in the data transmission apparatus is provided, wherein a flag is appended only to the data that needs tracing and only the processing result of the thus flagged data is stored in the memory, and wherein, after completing the processing, only the processing result of the flagged data is forcefully output outside the apparatus thus enabling the processing result to be retrieved.

7 Claims, 9 Drawing Sheets

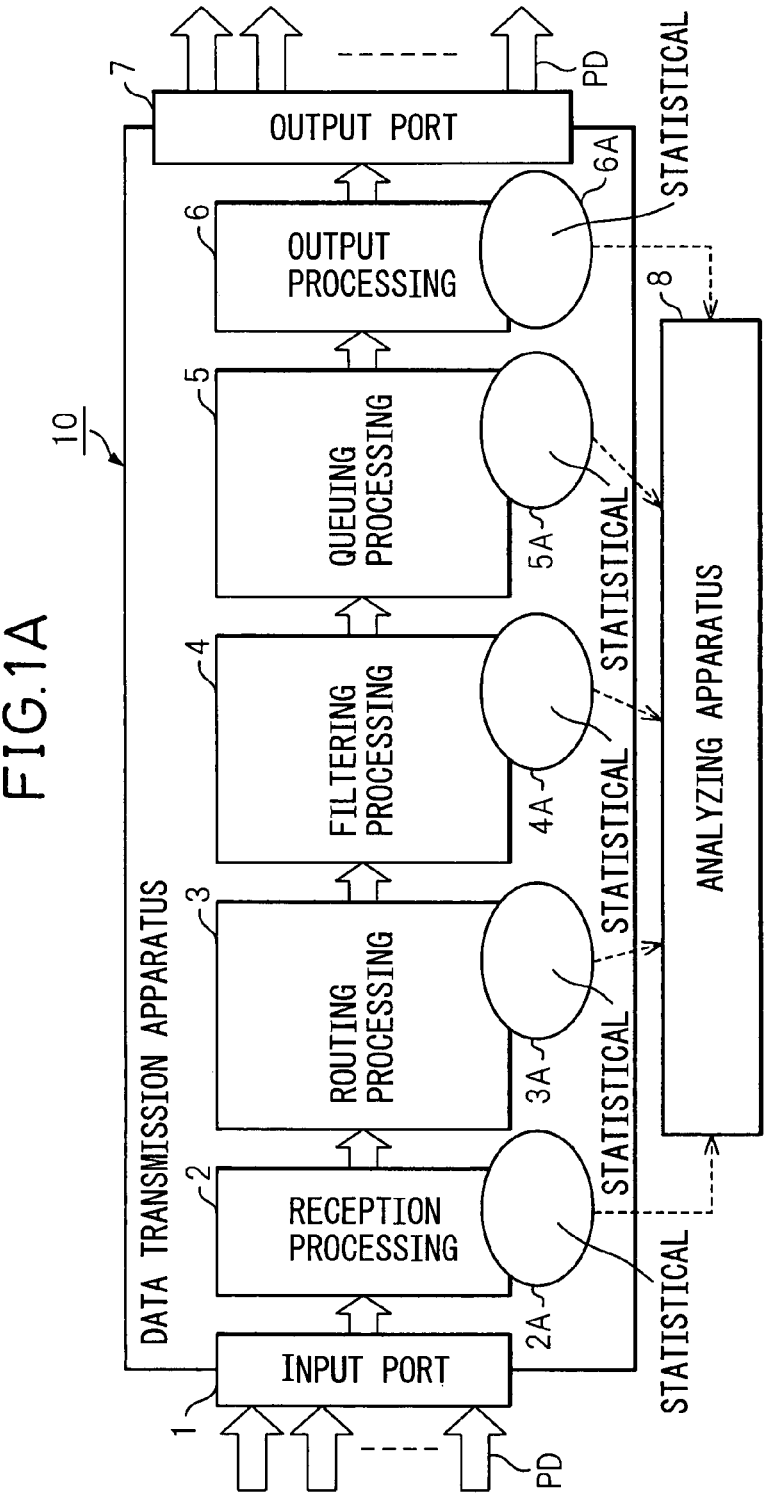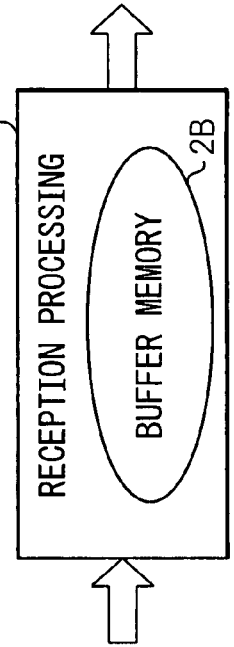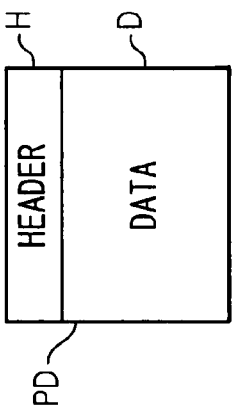

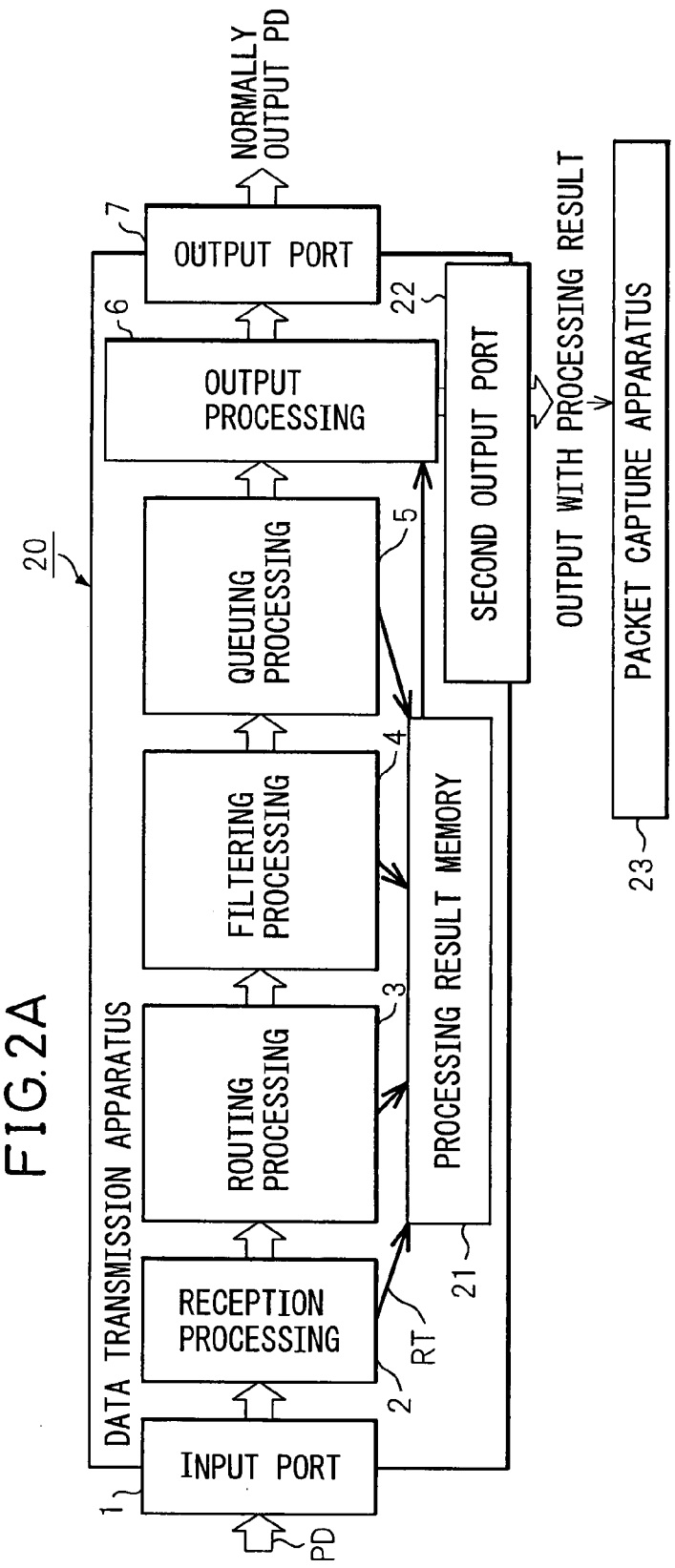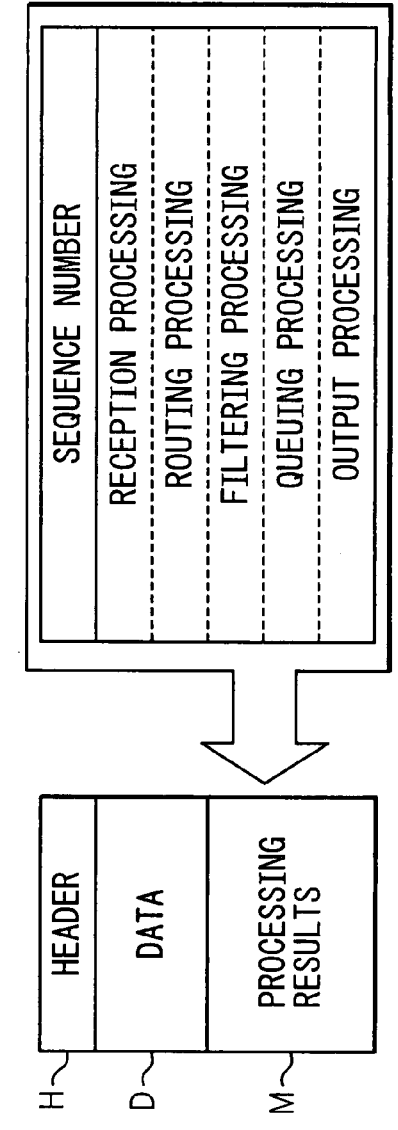

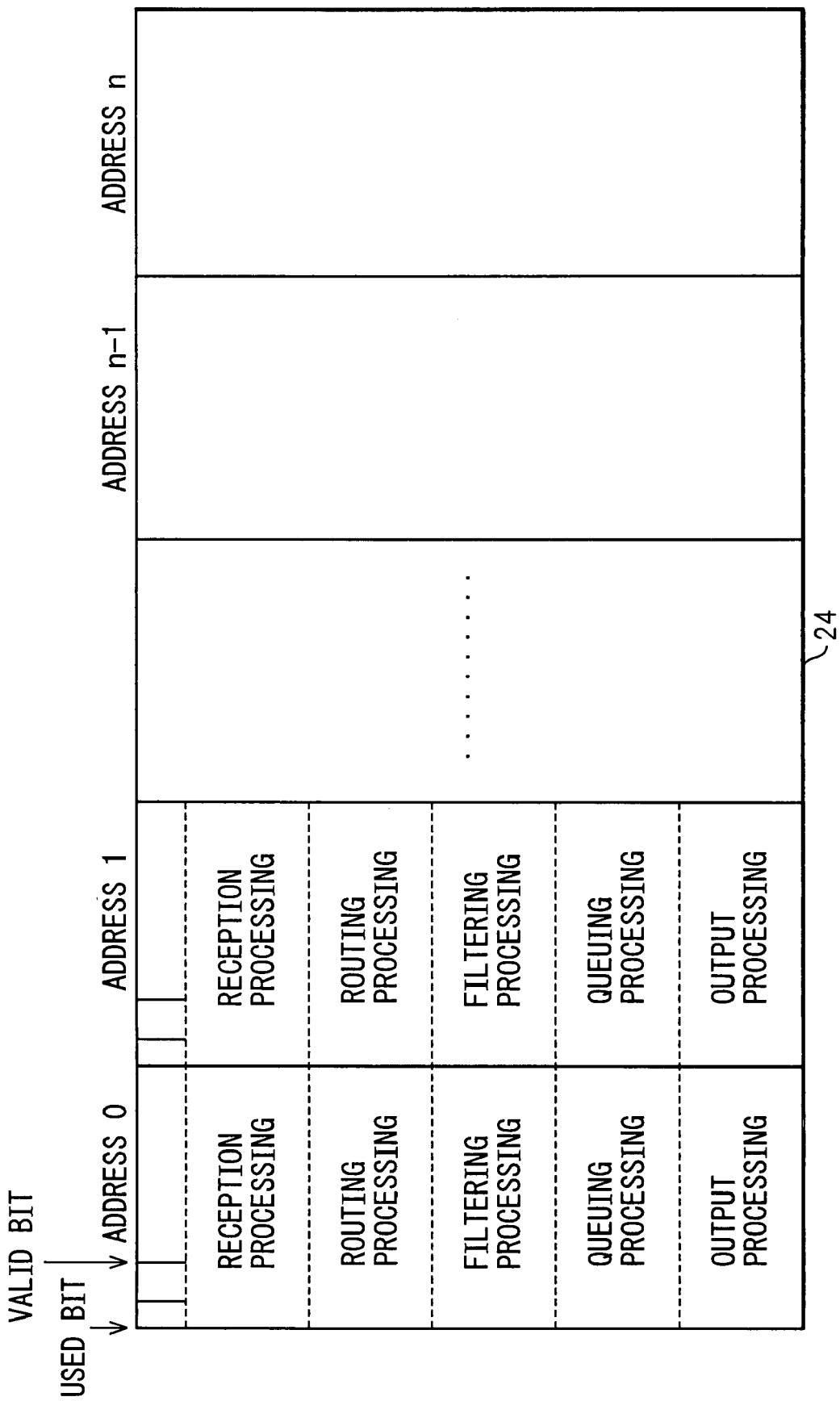

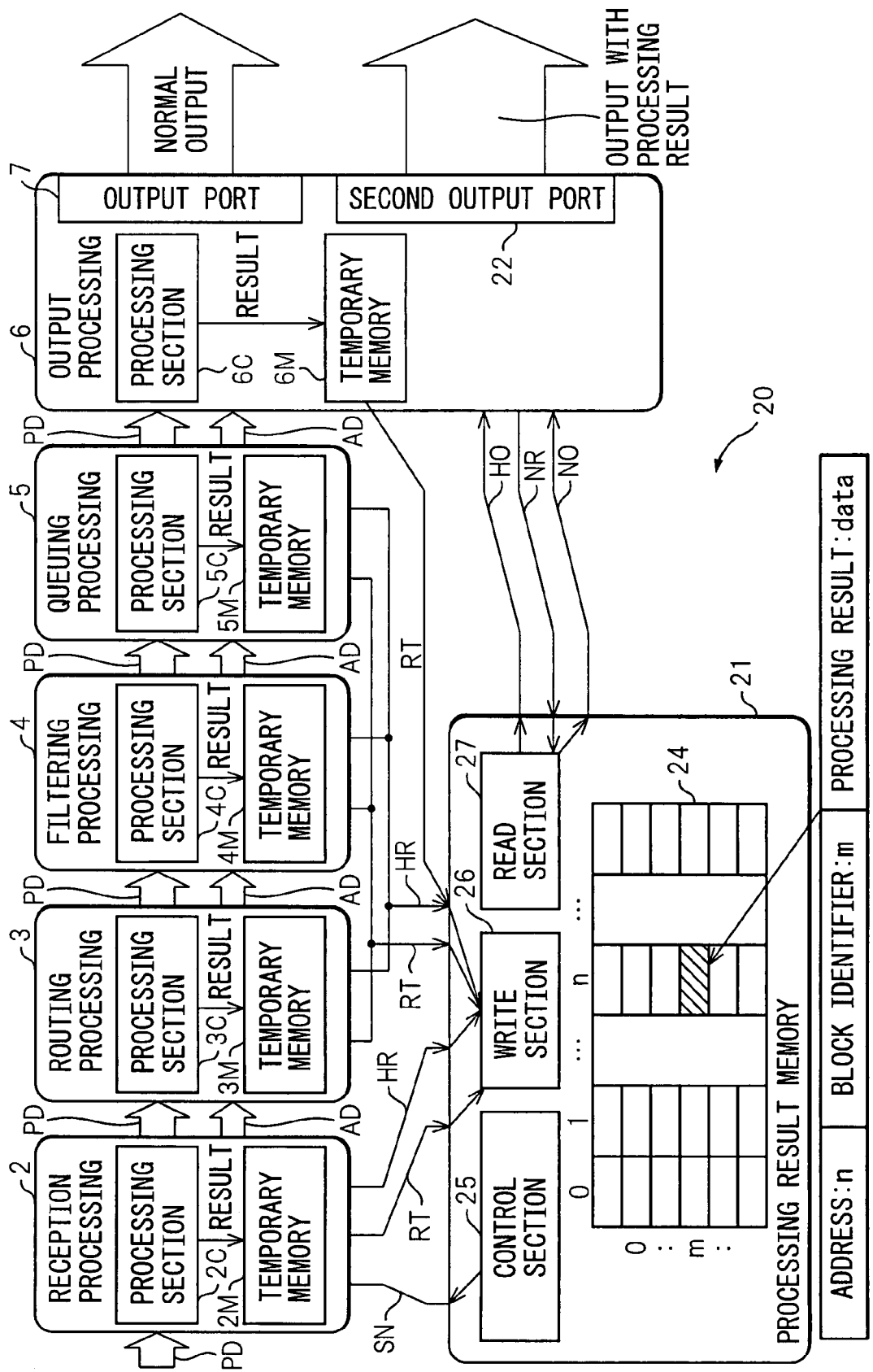

DATA TRANSMISSION APPARATUS AND DATA TRANSMISSION METHOD

CROSS-REFERENCE TO RELATED APPLICATION

This application claims priority from, and incorporates by reference the entire disclosure of, Japanese Patent Application No. 2006-321777, filed on Nov. 29, 2006.

BACKGROUND OF THE INVENTION

1. Field of the Invention

The present invention relates to a data transmission apparatus and a data transmission method, and more particularly to a data transmission apparatus that analyzes received data on a packet-by-packet basis, and based on the result of the analysis, sets the destination of the data or determines whether or not to transmit the data out, and a data transmission method for use by such a data transmission apparatus, wherein provisions are made so that the processing result of any desired packet processed in the data transmission apparatus can be acquired from outside the apparatus.

2. Description of the Related Art

It is known in the art to transmit data in the form of packets from one data transmission apparatus to another data transmission apparatus. Such a data transmission apparatus may sometimes be called a packet processing apparatus. The data transmission apparatus is equipped with a plurality of input ports (receive ports), and a plurality of processes appropriate to the contents of the packets received via the input ports are successively performed by a plurality of processing blocks provided within the apparatus. When the packets have been processed through the series of processing blocks, the data transmission apparatus transmits the packets out from a plurality of output ports (transmit ports) toward another transmission apparatus (see FIG. 1 in Japanese Unexamined Patent Publication No. 2002-164924).

The packet processing apparatus described in Japanese Unexamined Patent Publication No. 2002-164924 includes, in addition to the processing blocks, a multi-port memory as a processing result storing means in which the packet processing result from each processing block is stored. Each subsequent processing block reads out the packet processing result thus stored in the multi-port memory, and processes the packet by referring to the processing result.

The plurality of processing blocks incorporated in the data transmission apparatus, such as the packet processing apparatus are, for example, a reception processing block, a routing processing block, a filtering processing block, a queuing processing block, and an output processing block. The reception processing block performs processing for reception, and the routing processing block determines the destination of the packet. Further, the filtering processing block determines whether or not the packet should be transmitted out from the apparatus, the queuing processing block checks the transmission priority of the packet, and the output processing block performs processing for output.

In each processing block, statistical information (count value indicating the number of processed packets) and error information (count value indicating the number of error packets) are individually stored in a statistical part or a buffer memory provided within the processing block. In the prior art, when checking the settings of the data transmission apparatus, or when performing debugging to restore from a failure, the information stored in the statistical part or the buffer memory of each processing block is read out and analyzed by an analyzing apparatus provided inside or outside the data transmission apparatus, and the result of the analysis made by the analyzing apparatus is evaluated by the operator from a comprehensive standpoint.

To give a specific example, if there is a discrepancy in packet count value between one processing block and the next processing block in the data transmission apparatus, the operator determines that a packet has been discarded in the upstream block or has been directed to another block for processing.

In recent network products such as routers, as well as network controller LSIs, the variety of required functions has been increasing, and the integration of the increased variety of functions has been proceeding. In the data transmission apparatus as a generally used IP network product, a variety of processing operations are performed, including destination searching, filtering, and priority control, and there are many setup parameters associated with them. The correctness of each setup is verified by referring to the statistical information, error information, etc. available within the data transmission apparatus, but since such information is independently stored in each processing block, there has been the problem that, for any specific packet, it is difficult to trace its processing result.

For example, discarding of a packet, such as earlier described, can occur in any processing block, but the problem has been that it is not possible to know in which block the packet has been discarded, even if a reference is made to the statistical part or the buffer memory provided within each processing block. If only the intended packet data is input to the data transmission apparatus after clearing the counter values in the statistical parts of all the processing blocks, it is possible to verify whether the packet data has been duly processed and output or has been discarded in one of the processing blocks, but this is not a realistic method because such verification cannot be done during the operation of the data transmission apparatus.

Another possible approach to solving the above problem would be to store all the processing data of individual packets in the statistical part or the buffer memory of each processing block or, as in the packet processing apparatus described in Japanese Unexamined Patent Publication No. 2002-164924, to provide a multi-port memory and to store all of the packet processing results from the respective processing blocks into the multi-port memory. However, with these methods, the existing statistical part or buffer memory must be replaced by a large-capacity multi-port memory, or a multi-port memory has to be additionally provided, thus increasing cost.

SUMMARY OF THE INVENTION

Accordingly, it is an object of the present invention to provide a data transmission apparatus and a data transmission method wherein provisions are made to be able to trace the processing result of any specific packet, that is, a small-capacity processing result memory is added in the data transmission apparatus, a flag is appended to the processing result of the specific packet whose processing result is to be traced, and only the thus flagged processing result is stored in the processing result memory, with provisions made to output the processing result of the specific packet outside the data transmission apparatus via a packet output port or via another output port when the specific packet is transmitted out from the data transmission apparatus toward a designated destination or when the specific packet is discarded within the data transmission apparatus.

A data transmission apparatus according to the present invention, which achieves the above object, comprises: a receiving block which receives data having a header from a receive port; a routing block which, based on information carried in the header, selects from among a plurality of transmit ports a transmit port for transmitting out the data; a filtering processing block which determines based on the information whether the data is to be discarded or not, and performs processing for discarding the data; a processing result storing block which stores a processing result supplied from the filtering processing block; and an output processing block which outputs the data, if not discarded in the filtering processing block, to the selected transmit port by appending the processing result as processing result data to the data.

Further, a data transmission apparatus according to the present invention, which achieves the above object, comprises: a reception processing block which receives data having a header from a receive port; a routing processing block which, based on a source address and a destination address carried in the header, selects from among a plurality of transmit ports a transmit port for transmitting out the data; a filtering processing block which determines based on the selected transmit port whether the data is to be discarded or not, and performs processing for discarding the data; a queuing processing block which stores the data in a transmit queue if the data was not discarded in the filtering processing block; a processing result storing block which stores a processing result supplied from any one of the processing blocks; and an output processing block which outputs the data stored in the transmit queue to the selected transmit port by appending the processing result as processing result data to the data.

On the other hand, a data transmission method according to the present invention, which achieves the above object, comprises the steps of: receiving data having a header from a receive port; based on information carried in the header, selecting from among a plurality of transmit ports a transmit port for transmitting out the data; determining based on the information whether the data is to be discarded or not, and performing processing for discarding the data; storing the data in a transmit queue if the data was not discarded in the data discarding step; storing a processing result obtained from any one of the steps; outputting the processing result as processing result data; appending the processing result data to the data stored in the transmit queue; and outputting the data appended with the processing result data to the selected transmit port.

Further, a data transmission method according to the present invention, which achieves the above object, comprises the steps of: receiving data having a header from a receive port; based on a source address and a destination address carried in the header, selecting from among a plurality of transmit ports a transmit port for transmitting out the data; determining based on the selected transmit port whether the data is to be discarded or not, and performing processing for discarding the data; storing the data in a transmit queue if the data was not discarded in the data discarding step; storing a processing result obtained from any one of the steps; outputting the processing result as processing result data; appending the processing result data to the data stored in the transmit queue; and outputting the data appended with the processing result data to the selected transmit port.

According to the present invention, just by adding a small-capacity processing result memory in the data transmission apparatus, the processing result that indicates whether the specific packet whose processing result needs to be traced has been normally processed or has been discarded can be output from the normal packet output port or from a different port; accordingly, by connecting a packet capture apparatus to the processing result output port, it becomes possible to analyze the flow of the specific packet, and the processing result of the specific packet can thus be traced in an inexpensive way. That is, it becomes possible to investigate the specific packet without interfering with the normal operation of the data transmission apparatus.

BRIEF DESCRIPTION OF THE DRAWINGS

The present invention is illustrated by way of example, and not limitation, in the figures of the accompanying drawings in which like reference numerals indicate similar elements. Note that the following figures are not necessarily drawn to scale.

FIG. 1A is a block diagram showing the configuration of a prior art data transmission apparatus.

FIG. 1B is a diagram showing the format of a packet input and output to the data transmission apparatus of FIG. 1A.

FIG. 1C is a block diagram showing the configuration of a reception processing block when a buffer memory is provided instead of a statistical part in each processing block in the data transmission apparatus of FIG. 1A.

FIG. 2A is a block diagram showing the configuration of a data transmission apparatus according to one embodiment of the present invention.

FIG. 2B is a diagram showing the format of a packet input to the data transmission apparatus of FIG. 2A.

FIG. 3 is a diagram showing the internal organization of a processing result memory shown in FIG. 2A.

FIG. 4 is a diagram for explaining the operation of the data transmission apparatus according to the present invention shown in FIG. 3.

DESCRIPTION OF THE PREFERRED EMBODIMENTS

Figure 5A:
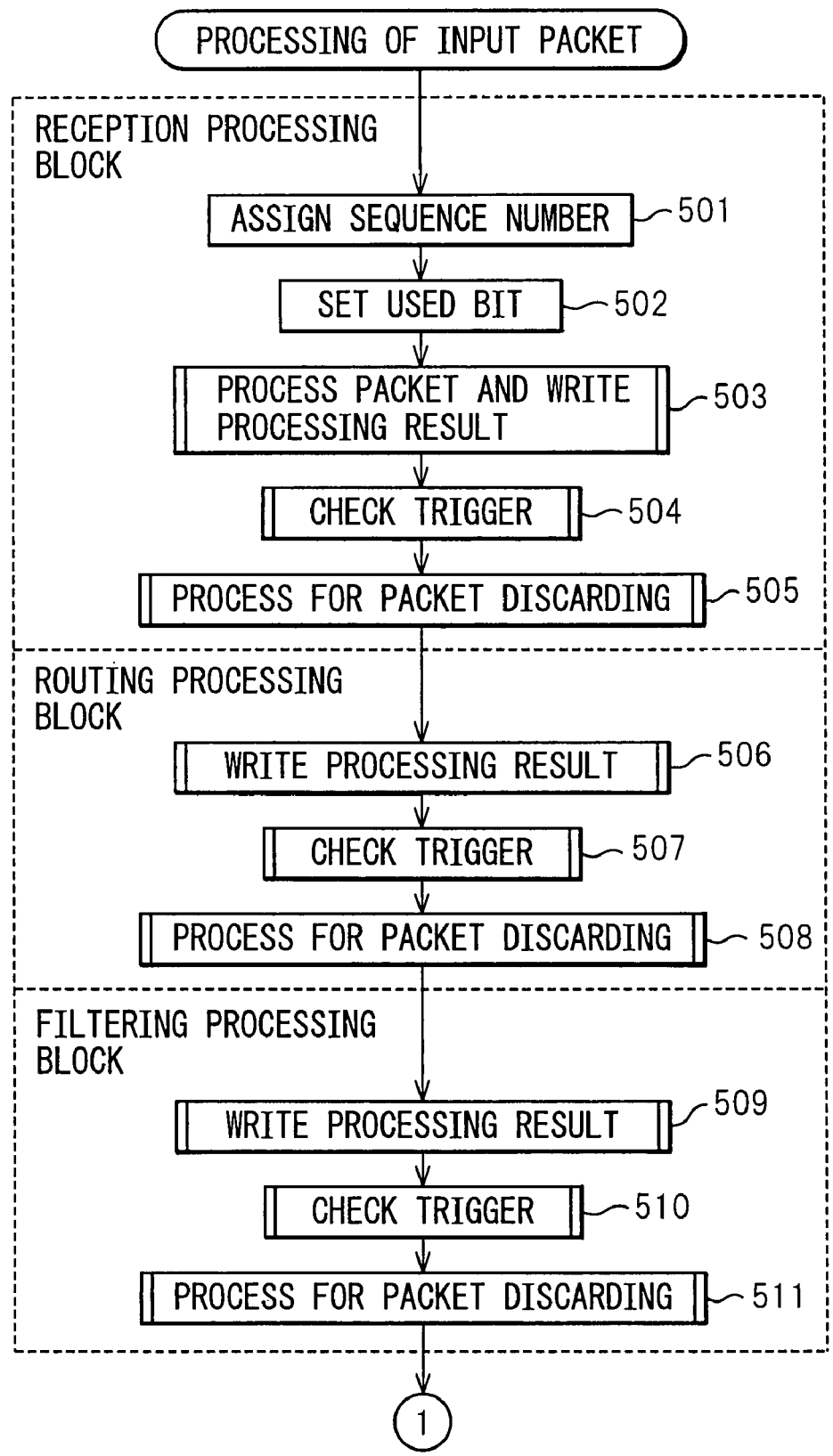
FIGS. 5A and 5B are flowcharts showing the flow of packet processing and processing results in the data transmission apparatus according to the present invention shown in FIG. 4.

Before describing the preferred embodiments, an explanation will be given of the conventional data transmission apparatus shown in FIGS. 1A to 1C.

FIG. 1A is a block diagram showing the configuration of the conventional data transmission apparatus 10. The data transmission apparatus 10 shown here is a packet processing apparatus, in which packet data PD input from the source via an input port (also called a receive port) 1 is processed by a reception processing block 2, a routing processing block 3, a filtering processing block 4, a queuing processing block 5, and an output processing block 6, and is output from an output port (also called a transmit port) 7 for transmission to a designated destination.

FIG. 1B is a diagram showing the format of the packet data PD input to the data transmission apparatus 10 of FIG. 1A. The packet data PD comprises a header H and a data field D, and the header H carries information indicating the source and destination.

The reception processing block 2 performs processing for the reception of the packet data PD, and the routing processing block 3 determines the destination of the packet. Further, the filtering processing block 4 determines whether or not the packet data PD should be transmitted out from the apparatus, the queuing processing block 5 checks the transmission priority of the packet data PD, and the output processing block 6 processes the packet data PD for output. In the respective processing blocks 2 to 6, statistical information (count value indicating the number of processed packets) and error information (count value indicating the number of error packets) are temporarily stored in statistical parts 2A to 6A provided within the respective processing blocks 2 to 6.

A buffer memory 2B such as shown in FIG. 1C may be provided instead of the statistical parts 2A to 6A (in FIG. 1C, only the buffer memory 2B in the reception processing block 2 is shown, but actually, buffer memories 2B to 6B are provided within the respective processing blocks 2 to 6).

In the thus configured prior art data transmission apparatus 10, when checking the apparatus settings, or when performing debugging to restore from a failure, the information stored in the statistical parts 2A to 6A of the respective processing blocks 2 to 6 is read out and analyzed by an analyzing apparatus 8 connected internally or externally to the data transmission apparatus 10. From each of the statistical parts 2A to 6A, the analyzing apparatus 8 can read out the count value indicating the number of packets processed by a corresponding one of the processing blocks 2 to 6.

The operator of the data transmission apparatus 10 checks the data that the analyzing apparatus 8 read out from the statistical parts 2A to 6A and, if there is a discrepancy in the count value of the processed packet data between one processing block and the next processing block in the data transmission apparatus 10, the operator determines that packet data has been discarded in the upstream processing block or has been directed to another block for processing.

However, in the prior art data transmission apparatus 10, since what is stored in each of the statistical parts 2A to 6A is the count value obtained by counting the processed packet data, there has been the problem that when one attempts to retrieve a processing result of a specific packet, there has been the problem that, for any specific packet, it is difficult to trace its processing result. For example, discarding of a packet such as earlier described can occur in any of the processing blocks 2 to 6, but the problem has been that it is not possible to know in which block the packet data has been discarded, even if a reference is made to any one of the statistical parts 2A to 6A provided within the respective processing units 2 to 6.

The present embodiment provides a data transmission apparatus that can solve this problem in an inexpensive way. FIG. 2A is a block diagram showing the configuration of a data transmission apparatus 20 according to one embodiment. The data transmission apparatus 20 of the present embodiment will be described below in which the same component elements as those in the earlier described prior art data transmission apparatus 10 are designated by the same reference numerals.

The data transmission apparatus 20 of the present embodiment also is a packet processing apparatus.

As in the prior art data transmission apparatus 10, packet data PD input from the source via the input port 1 is processed by the reception processing block 2, the routing processing block 3, the filtering processing block 4, the queuing processing block 5, and the output processing block 6, and is output from the output port 7 for transmission to a designated destination. The functions of the respective blocks 2 to 6 are substantially the same as those of the corresponding blocks of the prior art data transmission apparatus 10.

The data transmission apparatus 20 of the present embodiment further includes a processing result memory 21 for storing processing results supplied from the reception processing block 2, the routing processing block 3, the filtering processing block 4, and the queuing processing block 5. The information stored in the processing result memory 21 is sent to the output processing block 6, and is output as an output with processing result to a second output port 22 which is different from the output port 7 to which the processed packet data is output. The output of the processing result can be checked by a packet capture apparatus 23 connected to the second output port 22.

On the other hand, the format of the packet data input to the data transmission apparatus 20 of the present embodiment comprises, as shown in FIG. 2B, a processing result field M in which the processing results of the packet data can be stored, in addition to the header H and the data field D shown in the format of the packet data PD (FIG. 1B) input to the prior art data transmission apparatus 10. A sequence number as an address in the processing result memory 21 and the processing results from the respective blocks 2 to 6 are stored in the processing result field M.

FIG. 3 is a diagram showing the organization of a storage section 24 provided within the processing result memory 21 shown in FIG. 2A. There are a plurality of addresses from address 0 to address n (n is a positive integer) in the storage section 24, and each address contains a Used bit and a Valid bit, each for setting a flag, and storage areas for storing the reception processing result, routing processing result, filtering processing result, queuing processing result, and output processing result, respectively.

The Used bit is enabled ("1") when the address is used for any packet data, and disabled ("0") when it is determined that the packet data has been discarded. The Used bit is also disabled ("0") when it is determined that the packet data is a packet to be output without appending the processing results. On the other hand, the Valid bit is enabled ("1") when it is determined that the packet data is to be output by appending the processing results, and disabled ("0") when it is determined that the packet data need not be output by appending the processing results. Here, the "enabled" state refers to the state in which the flag is set, and the "disabled" state refers to the state in which the flag is not set.

As shown in FIG. 4, the processing result memory 21 includes, in addition to the storage section 24, a memory control section 25, a write section 26, and a read section 27. The addresses in the storage section 24 are arranged in the form of a matrix array. The reception processing block 2, the routing processing block 3, the filtering processing block 4, the queuing processing block 5, and the output processing block 6 respectively include processing sections 2C to 6C for performing the respective processing operations and temporary memories 2M to 6M for storing the respective processing results. In this configuration, the processing blocks 2 to 6 perform the respective processing operations and write the processing results to the respective temporary memories 2M to 6M.

The operation of the data transmission apparatus 20 of the present embodiment will be described below with reference to FIG. 4. When the packet data PD is input to the reception processing block 2, the reception processing block 2 assigns a sequence number SN to the input packet data. The sequence number SN represents the address in the storage section 24 of the processing result memory 21. Here, the memory control section 25 selects an unused address (an address whose Used bit is disabled) in the storage section 24, and offers it to the reception processing block 2. The Used bit contained in the thus offered address in the storage section 24 is enabled.

When the address is assigned to the packet data, the processing blocks 2 to 6, after completing the respective processing operations, send the processing results RTs to the write section 26 of the processing result memory 21 via the respective temporary memories 2M to 6M, and the write section 26 then writes the processing results RTs to the storage section 24 at the address assigned by the memory control section 25. The contents written here include an error check, statistical processing, etc. and, in the case of the routing processing block 3 and the filtering processing block 4, further include a search key and search result. The packet data PD input to the reception processing block 2 is processed by the respective processing blocks 2 to 6, as in the prior art apparatus, and output as normally output data from the output port of the output processing block 6, or is discarded in one of the processing blocks 2 to 6. In the data transmission apparatus 20 of the present embodiment, after the address is assigned, the packet data PD is moved to the next processing block together with the assigned address AD, provided that the Used bit of the address remains enabled.

Here, in the data transmission apparatus 20 of the present embodiment, an address in the storage section 24 of the processing result memory 21 is assigned to any packet data PD input to the reception processing block 2, and the Used bit contained in the thus assigned address in the storage section 24 is enabled. On the other hand, some packet data PD input to the reception processing block 2 may be of the kind for which the processing results from respective processing blocks 2 to 6 need not be traced. In the present embodiment, if the packet data PD input to the reception processing block 2 is of the kind whose processing results need not be traced, the Valid bit is enabled ("1"), and if the packet data is of the kind that need not be output by appending the processing results, the Valid bit is disabled ("0") while also disabling the Used bit ("0"), and the address assigned to the packet data is cleared.

A decision as to whether the Valid bit should be enabled ("1") or not is made in any one of processing blocks 2 to 6, the state of the bit being selectable by using the count up, etc. of the specific statistical information and error information as a trigger; that is, when checking the trigger in any one of the processing blocks up to the queuing block 5, if it is determined that the trigger setting for the packet data has not been executed, then the Used bit is disabled at this instant in time. When the Used bit is disabled, the address in the storage section 24 of the processing result memory 21 can be assigned to new packet data input to the reception processing block 2.

Since it is not known in which processing block up to the queuing block 5 the Valid bit will be enabled, each time the processing is completed in the respective processing blocks 2 to 5 the processing results RTs from the respective processing blocks 2 to 5 are sent via the respective temporary memories 2M to 6M to the write section 26 of the processing result memory 21 and written to the corresponding address in the storage section 24.

Here, if packet data is discarded in any one of the processing blocks 2 to 5, the subsequent processing differs depending on whether the Valid bit for the packet data is in the enabled state or the disabled state. If the Valid bit for the packet data is in the disabled state, the operation of each of the processing blocks 2 to 5 is the same as that of the prior art apparatus, that is, nothing is done.

On the other hand, if the Valid bit for the packet data discarded in a certain block is in the enabled state, the block that discarded the packet data sends a packet discard processing result output request HR to the processing result memory 21. The packet discard processing result output request HR is input to the read section 27 which, in response, retrieves the processing result HO of the discarded packet data from the storage section 24 and sends it to the output processing block 6. The output processing block 6 forcefully outputs the processing result HO of the discarded packet data from the second output port 22. Here, only the processing result HO of the packet data may be forcefully output from the second output port 22, or the packet data appended with the processing result HO may be forcefully output as an output appended with the processing result.

If the packet data has not been discarded in any of the processing blocks 2 to 5, then if the Valid bit for the packet data is in the enabled state when the packet data is output from the output processing block 6, the output processing block 6 sends a normally output packet processing result output request NR to the processing result memory 21. The normally output packet processing result output request NR is input to the read section 27 which, in response, retrieves the processing result NO of the normally output packet data from the storage section 24 and sends it to the output processing block 6. The output processing block 6 forcefully outputs the processing result NO of the normally output packet data from the second output port 22. Here, only the processing result NO of the packet data may be forcefully output from the second output port 22, or the packet data appended with the processing result HO may be forcefully output as an output appended with the processing result.

After the processing result HO of the discarded packet data is forcefully output from the second output port 22, or after the processing result NO of the normally output packet data is forcefully output from the second output port 22, the Valid bit and the Used bit are both cleared.

Figure 5B:
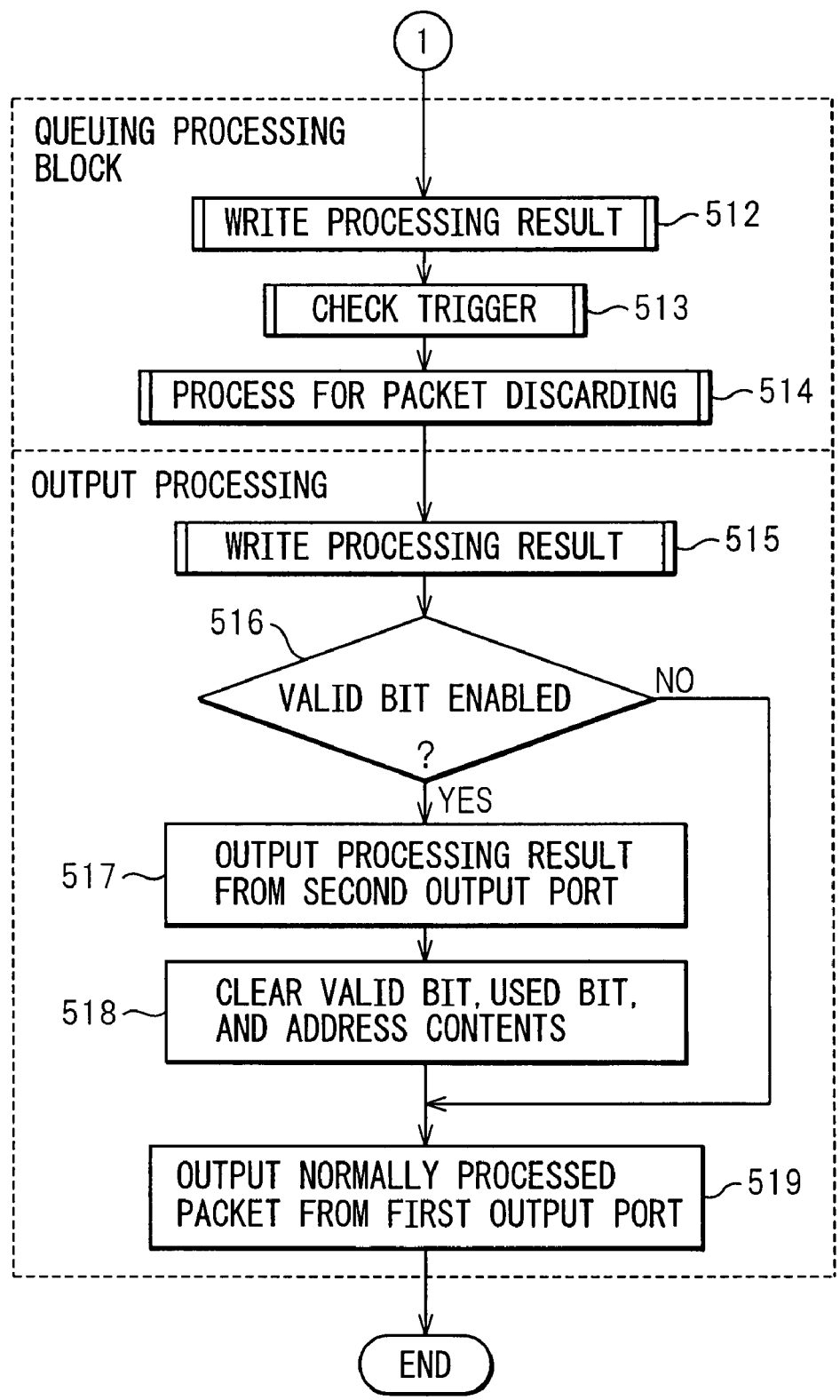
Figure 6:
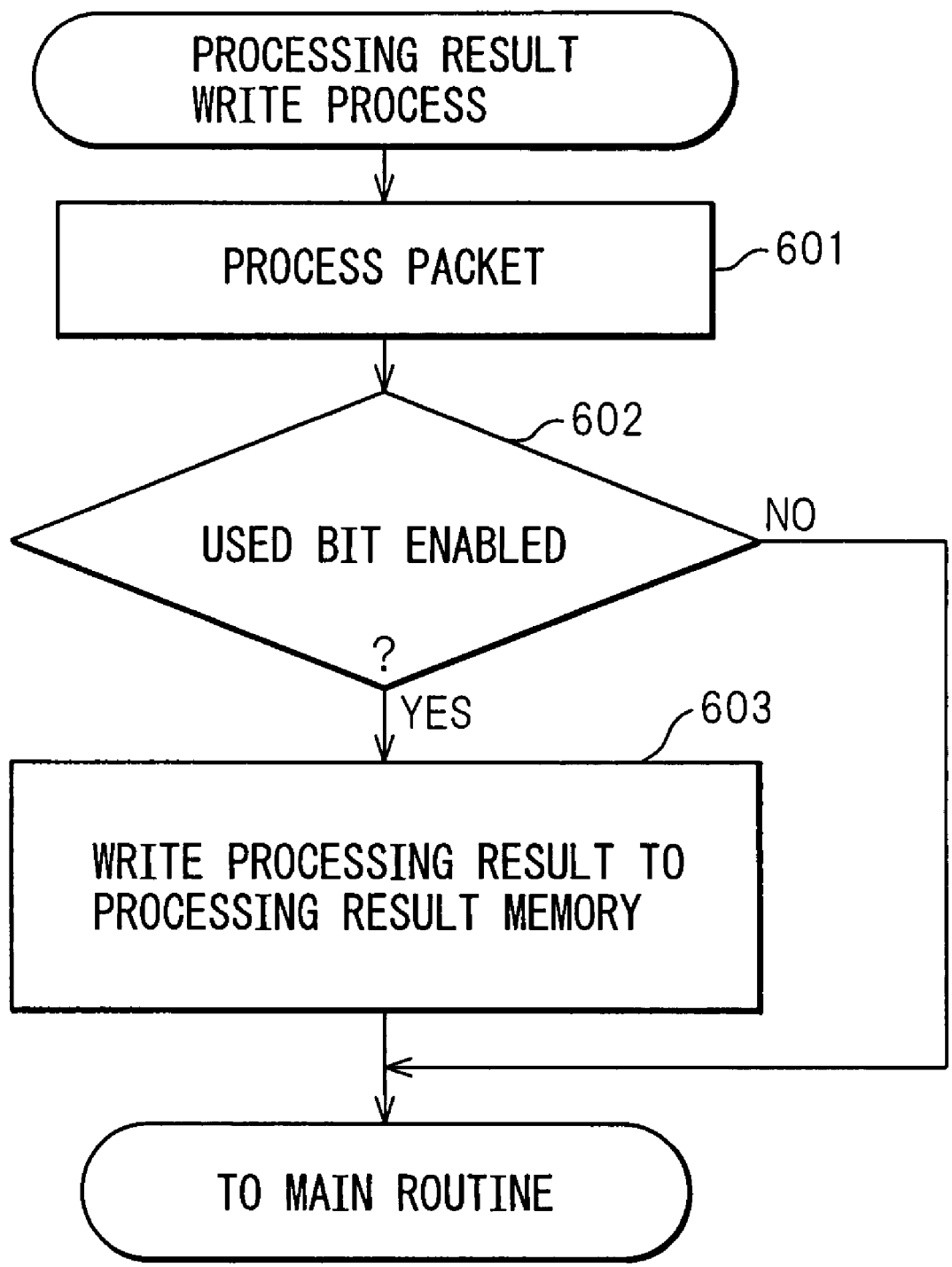
FIG. 6 is a flowchart illustrating in detail a processing result write process shown in FIG. 5.
Figure 7:
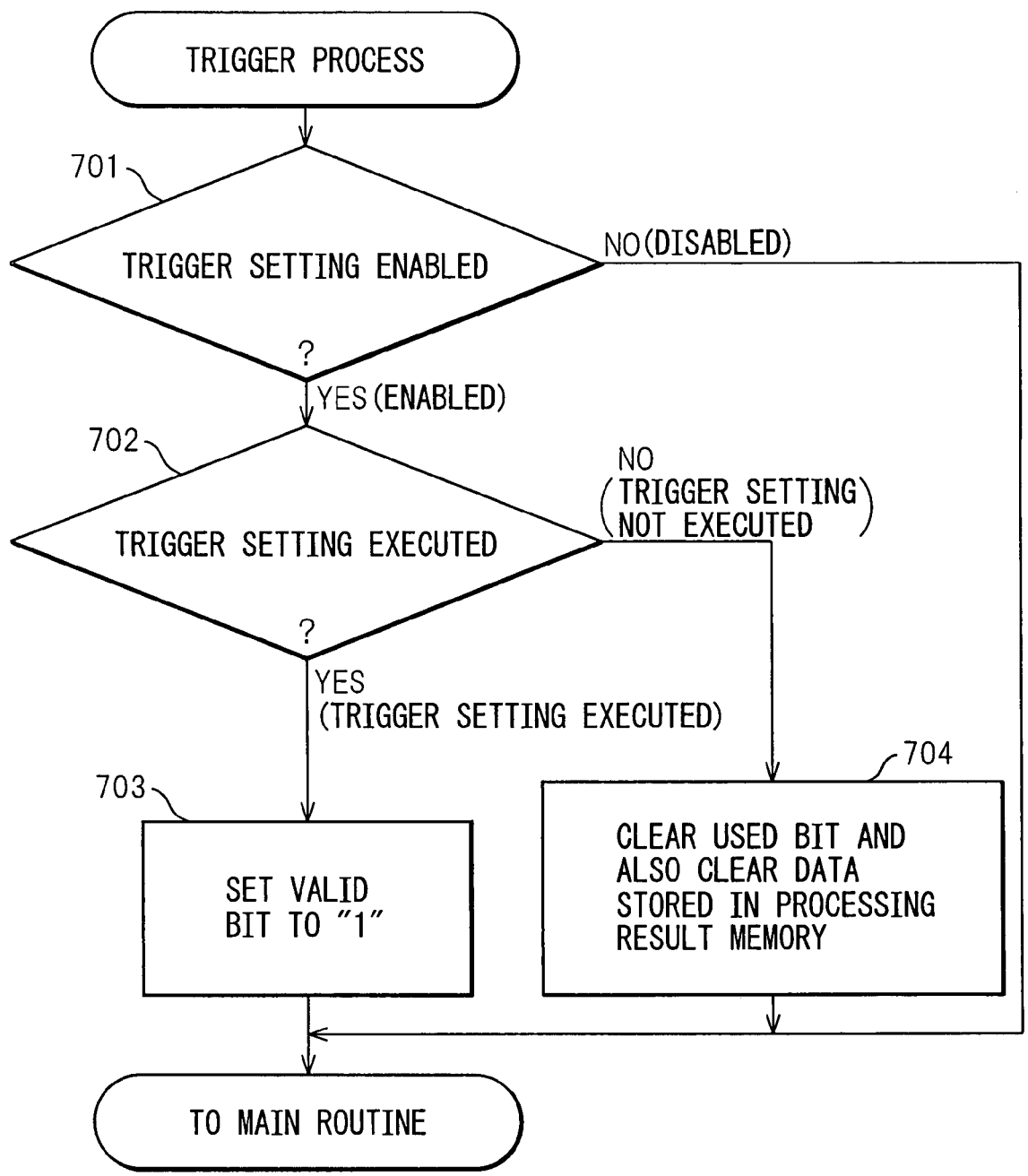
FIG. 7 is a flowchart illustrating in detail a trigger process shown in FIG. 5.
Figure 8:
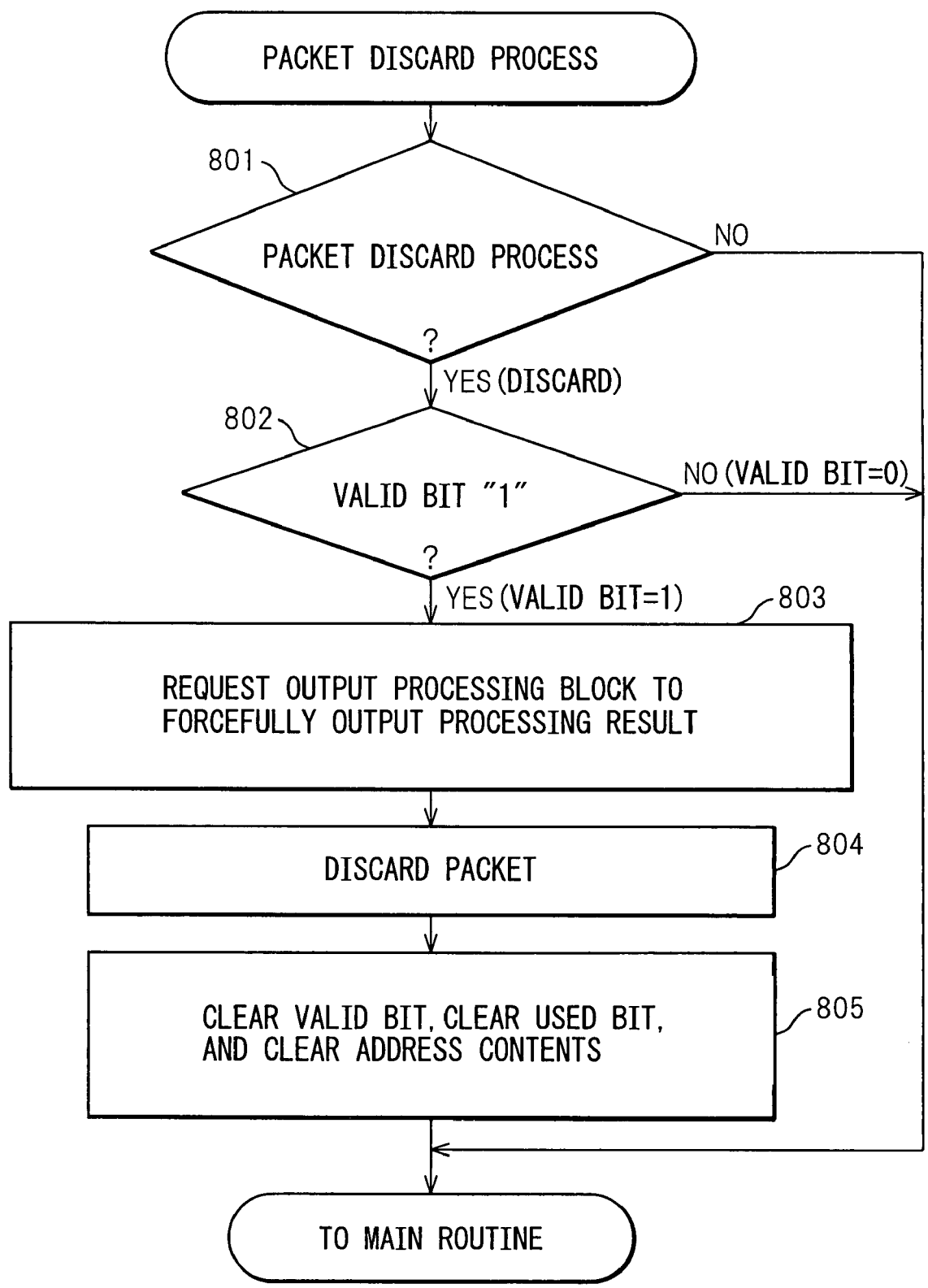
FIG. 8 is a flowchart illustrating in detail a packet discard process shown in FIG. 5.

Next, the operation of the data transmission apparatus 20 of the present embodiment will be described in detail with reference to the flowcharts shown in FIG. 5A to 8. The flowcharts of FIGS. 5A and 5B show the overall process flow of the data transmission apparatus 20 of the present embodiment, and FIGS. 6 to 8 are flowcharts for explaining in detail the processing result write process, the trigger checking process, and the packet discard process, respectively, shown in FIGS. 5A and 5B.

First, the overall process flow of the data transmission apparatus of the present embodiment will be described with reference to FIGS. 5A and 5B. When packet data is input to the reception processing block, a sequence number (an address in the processing memory) is assigned in step 501. In the next step 502, the Used bit is set to the enabled state, and in the subsequent step 503, the packet is processed and the result of the processing is written to the temporary memory.

In step 504, the trigger is checked to determine whether the Valid bit should be enabled or not, and after that, the process proceeds to step 505 to perform processing when the packet data is discarded. The processing up to this point is performed in the reception processing block. The processing result write process, the trigger checking process, and the packet discard process will each be described in detail later.

When the processing in the reception processing block is completed, the packet data is sent to the routing processing block. In the routing processing block, the processing result write process is performed in step 506, which is followed by the trigger checking process in step 507 where it is determined whether the Valid bit should be enabled or not, and after that, processing when the packet data is discarded (the packet discard process) is performed in step 508.

When the processing in the routing processing block is completed, the packet data is sent to the filtering processing block. In the filtering processing block, the processing result write process is performed in step 509, which is followed by the trigger checking process in step 510 where it is determined whether the Valid bit should be enabled or not, and after that, processing when the packet data is discarded (the packet discard process) is performed in step 511.

When the processing in the filtering processing block is completed, the packet data is sent to the queuing processing block. In the queuing processing block, the processing result write process is performed in step 512, which is followed by the trigger checking process in step 513 where it is determined whether the Valid bit should be enabled or not, and after that, processing when the packet data is discarded (the packet discard process) is performed in step 514.

When the processing in the queuing processing block is completed, the packet data is sent to the output processing block. In the output processing block, the processing result write process is performed in step 515, which is followed by step 516 where it is determined whether the Valid bit is enabled or not. If the Valid bit is disabled, the process proceeds to step 519, and the normally processed packet is output from the output port (first output port), whereupon the routine is terminated.

On the other hand, if it is determined in step 516 that the Valid bit is enabled, the process proceeds to step 517 where the processing result is forcefully output from the second output port, after which the process proceeds to step 518. In step 518, the Valid bit and the Used bit are both cleared, while also clearing the contents stored at the corresponding address in the processing result memory. After carrying out the step 518, the process proceeds to step 519, and the normally processed packet is output from the output port (first output port), whereupon the routine is terminated.

Next, the subroutine for carrying out the processing result write process in steps 503, 506, 509, and 512 will be described with reference to FIG. 6. In the processing result write process, the predetermined packet processing is performed in step 601. The details of the packet processing differ for each processing block. In the next step 602, the Used bit contained in the address of the packet data is checked to see if it is enabled or not; if the Used bit is disabled, nothing is done, and the process returns to the main routine, but if the Used bit is enabled, the process proceeds to step 603 where the result of the packet processing performed in step 601 is written to the processing result memory, after which the process returns to the main routine. In this way, if the Used bit is disabled in the packet processing, since there is no longer any need to refer to the processing result, the subroutine is terminated without writing the processing result to the processing result memory.

Next, the subroutine for carrying out the trigger checking process in steps 504, 507, 510, and 513 will be described with reference to FIG. 7. In the trigger checking process, it is determined in step 701 whether the trigger setting is enabled or disabled. The trigger setting is enabled in one of the processing blocks from the reception processing block to the queuing processing block. If the trigger setting is disabled, nothing is done, and the process returns to the main routine, but if the trigger setting is enabled, the process proceeds to step 702. In step 702, a decision is made as to whether or not to execute the trigger setting, that is, whether or not to enable the Valid bit. If it is decided that the trigger setting be executed, the process proceeds to step 703 where the Valid bit is enabled ("1"), after which the process returns to the main routine.

On the other hand, if in step 702, it is decided not to execute the trigger setting for the packet data, the process proceeds to step 704. In step 704, the Used bit is cleared ("0"), and the address (sequence number) of the packet data and hence the data held at the corresponding address in the processing result memory is also cleared, after which the process returns to the main routine.

Lastly, the subroutine for carrying out the packet discard process in steps 505, 508, 511, and 514 will be described with reference to FIG. 8. In the packet discard process, it is determined in step 801 whether or not the packet discard process is to be executed. If the packet discard process is not to be executed, nothing is done, and the process returns to the main routine, but if the packet discard process is to be executed, the process proceeds to step 802. In step 802, the Valid bit is checked to see if it is enabled ("1") or not. If the Valid bit is disabled ("0"), nothing is done, and the process returns to the main routine, but if the Valid bit is enabled ("1"), the process proceeds to step 803.

In step 803, a request is made to the output processing block to forcefully output the processing result, and in the next step 804, the packet data is discarded. As a result, the packet data is discarded, and therefore, not output from the output port 7, but only the processing result indicating that the packet data has been discarded is forcefully output from the second output port 22. In the next step 805, the Valid bit is cleared (disabled by setting it to "0") and the Used bit is also cleared ("0"), while also clearing the contents stored at the corresponding address in the processing result memory 21.

In the embodiment described above, the processing result of the packet data for which the Valid bit is enabled is output from the second output port, but instead, provisions may be made to output it from the normal output port. In this case, after internally processing the packet data, the internal processing result of the packet data may be output by appending it to the main body of the output packet.

A specific example relating to the above embodiment will be described for the case where the processing result such as described below is obtained.

Reception processing block: Packet data is received normally, the counter counts up, and the error check shows no error.

Routing processing block: Type of packet is identified, search key (source address, destination address) is detected as being included in header information, the search result indicates that the packet is to be transmitted to the transmit port, and the error check shows no error.

Filtering processing block: Search key (source address, destination address) is detected as being included in header information, the search result indicates that the packet is to be discarded, and the error check shows no error.

Queuing processing block: No data

Output processing block: No data

In this case, if the search key is set to serve as a trigger, the Valid bit is enabled in the routing processing block and, even when the packet data is discarded and the processing result is not output from the output port, it can be seen from the search result of the filtering processing block that the packet data has been discarded in the filtering processing block.

Although only some exemplary embodiments have been described in detail above, those skilled in the art will readily appreciate that many modifications are possible in the exemplary embodiments without materially departing from the novel teachings and advantages of these embodiments. Accordingly, all such modifications are intended to be included within the scope of these embodiments.

What is claimed is:

1. A data transmission apparatus having a plurality of packet data processing blocks processing packet data between an input port and an output port, comprising:

a reception processing block connected with said input port, equipped with a processing section and a temporary memory which stores a processing result of the packet data;

a routing processing block connected with an output of said reception processing block, equipped with a processing section and a temporary memory which stores a processing result of the packet data;

a filtering processing block connected with an output of said routing processing block, equipped with a processing section and a temporary memory which stores a processing result of the packet data;

a queuing processing block connected with an output of said filtering processing block, equipped with a processing section and a temporary memory which stores a processing result of the packet data;

an output processing block whose input is connected with an output of said filtering processing block and whose output is connected with said output port and a second output port, equipped with a processing section and a temporary memory which stores a processing result of the packet data; and a processing result storing block whose input is connected with outputs of said reception processing block, said routing processing block, said filtering processing block and said queuing processing block and whose output is connected with said output processing block, equipped with a storage section, a memory control section, a write section to said storage section and a read section from said storage section;

said reception processing block receives packet data having a header, a data field and a processing result field from a receiver port, performs assigning an address in said storage section provided from said memory control section in said processing result storing block, and outputs said processing result of said packet data and stores the same in said temporary memory;

said routing processing block selects a transmit port for transmitting out said data, from a plurality of transmit ports, based on a source address and a destination address carried in said header, and outputs and stores said processing result of said data in said temporary memory;

said filtering processing block determines based on the transmit port selected, whether said data are to be discarded, performs processing for discarding said data when determined that said data are to be discarded, and outputs and stores said processing result of said data in said temporary memory;

said queuing processing block stores said data in a transmit queue according to data priority, when said data were not discarded in said filtering processing block, and outputs and stores said processing result of said data in said temporary memory;

said output processing block outputs said data stored in said transmit queue to said output port by appending the processing results to said data when said data were not discarded in said filtering processing block and outputs and stores the processing results at a second output port in said temporary memory, when said data were discarded;

in said processing result storing block, said memory control section offers the address in said storage section to said reception processing block and enables a validity bit and an Used bit in offered address, said write section stores the processing results of each processing block in said storage section via the temporary memories in each processing block, and further, said read section reads out the stored information in the storage section and sends to the output processing block;

in each processing block, after the address is assigned, the packet data is moved to a next processing block together with the assigned address when the Used bit of the address remains enabled, and the validity bit is disabled when the packet data is of the kind that need not be traced; and said memory control section disables the Used bit when detecting that a corresponding valid bit is to be disabled, and assigns the address of the disabled Used bit in the storage section to new packet data input to the reception processing block.

2. A data transmission apparatus as claimed in claim 1, wherein said address in the storage section is a sequence number of the storage section.

3. A network analyzing apparatus for analyzing packet data received from a data transmission apparatus, said data transmission apparatus comprising:

a reception processing block connected with an input port, equipped with a processing section and a temporary memory which stores a processing result of the packet data;

a routing processing block connected with an output of said reception processing block, equipped with a processing section and a temporary memory which stores a processing result of the packet data;

a filtering processing block connected with an output of said routing processing block, equipped with a processing section and a temporary memory which stores a processing result of the packet data;

a queuing processing block connected with an output of said filtering processing block, equipped with a processing section and a temporary memory which stores a processing result of the packet data;

an output processing block whose input is connected with an output of said filtering processing block and whose output is connected with an output port and a second output port, equipped with a processing section and a temporary memory which stores a processing result of the packet data; and a processing result storing block whose input is connected with outputs of said reception processing block, said routing processing block, said filtering processing block and said queuing processing block and whose output is connected with said output processing block, equipped with a storage section, a memory control section, a write section to said storage section and a read section from said storage section;

said reception processing block receives packet data having a header, a data field and a processing result field from a receiver port, performs assigning an address in said storage section provided from said memory control section in said processing result storing block, and outputs said processing result of said packet data and stores the same in said temporary memory;

said routing processing block selects a transmit port for transmitting out said data, from a plurality of transmit ports, based on a source address and a destination address carried in said header, and outputs and stores said processing result of said data in said temporary memory;

said filtering processing block determines based on the transmit port selected, whether said data are to be discarded, performs processing for discarding said data when determined that said data are to be discarded, and outputs and stores said processing result of said data in said temporary memory;

said queuing processing block stores said data in a transmit queue according to data priority, when said data were not discarded in said filtering processing block, and outputs and stores said processing result of said data in said temporary memory;

said output processing block outputs said data stored in said transmit queue to said output port by appending the processing results to said data when said data were not discarded in said filtering processing block and outputs and stores the processing results at a second output port in said temporary memory, when said data were discarded;

in said processing result storing block, said memory control section offers the address in said storage section to said reception processing block and enables a validity bit and an Used bit in offered address, said write section stores the processing results of each processing block in said storage section via the temporary memories in each processing block, and further, said read section reads out the stored information in the storage section and sends to the output processing block;

in each processing block, after the address is assigned, the packet data is moved to a next processing block together with the assigned address when the Used bit of the address remains enabled, and the validity bit is disabled when the packet data is of the kind that need not be traced; and said memory control section disables the Used bit when detecting that a corresponding valid bit is to be disabled, and assigns the address of the disabled Used bit in the storage section to new packet data input to the reception processing block.

4. An information processing system which processes packet data, comprising:

a data transmission apparatus; and an information processing apparatus connected to said data transmission apparatus, said data transmission apparatus having:

a reception processing block connected with an input port, equipped with a processing section and a temporary memory which stores a processing result of the packet data;

a routing processing block connected with an output of said reception processing block, equipped with a processing section and a temporary memory which stores a processing result of the packet data;

a filtering processing block connected with an output of said routing processing block equipped with a processing section and a temporary memory which stores a processing result of the packet data;

a queuing processing block connected with an output of said filtering processing block, equipped with a processing section and a temporary memory which stores a processing result of the packet data;

an output processing block whose input is connected with an output of said filtering processing block and whose output is connected with an output port and a second output port, equipped with a processing section and a temporary memory which stores a processing result of the packet data; and a processing result storing block whose input is connected with outputs of said reception processing block, said routing processing block, said filtering processing block and said queuing processing block and whose output is connected with said output processing block, equipped with a storage section, a memory control section, a write section to said storage section and a read section from said storage section;

said reception processing block receives packet data having a header, a data field and a processing result field from a receiver port, performs assigning an address in said storage section provided from said memory control section in said processing result storing block, and outputs said processing result of said packet data and stores the same in said temporary memory;

said routing processing block selects a transmit port for transmitting out said data, from a plurality of transmit ports, based on a source address and a destination address carried in said header, and outputs and stores said processing result of said data in said temporary memory;

said filtering processing block determines based on the transmit port selected, whether said data are to be discarded, performs processing for discarding said data when determined that said data are to be discarded, and outputs and stores said processing result of said data in said temporary memory;

said queuing processing block stores said data in a transmit queue according to data priority, when said data were not discarded in said filtering processing block, and outputs and stores said processing result of said data in said temporary memory;

said output processing block outputs said data stored in said transmit queue to said output port by appending the processing results to said data when said data were not discarded in said filtering processing block and outputs and stores the processing results at a second output port in said temporary memory, when said data were discarded in said processing result storing block, said memory control section offers the address in said storage section to said reception processing block and enables a validity bit and an Used bit in offered address, said write section stores the processing results of each processing block in said storage section via the temporary memories in each processing block, and further, said read section reads out the stored information in the storage section and sends to the output processing block;

in each processing block, after the address is assigned, the packet data is moved to a next processing block together with the assigned address when the Used bit of the address remains enabled, and the validity bit is disabled when the packet data is of the kind that need not be traced; and said memory control section disables the Used bit when detecting that a corresponding valid bit is to be disabled, and assigns the address of the disabled Used bit in the storage section to new packet data input to the reception processing block.

5. A data transmission method, comprising: receiving data having a header from a receive port;

selecting a transmit port for transmitting out said data from a plurality of transmit ports based on information carried in said header;

determining based on said information whether said data are to be discarded or not, and performing processing for discarding said data if determined that said data are to be discarded;

storing said data in a transmit queue according to data priority if said data were not discarded;

storing, in a processing result memory, processing results and a corresponding validity bit, the processing results including a reception processing result from the receiving, a routing processing result from the selecting, a filtering processing result from the determining, and a queuing processing result from the storing of said data;

enabling a validity bit and an Used bit in an offered address and said storing includes storing the processing results of each processing block;

setting the corresponding validity bit for the processing results if the processing results are to be output according to the receiving, selecting, and storing of said data;

appending the processing results to said data stored in said transmit queue if said data were not discarded and the corresponding validity bit is enabled; and outputting said data appended with the processing results to the transmit port selected, if said data were not discarded, and outputting the processing results to a secondary port if said data were discarded and the corresponding validity bit is enabled, and wherein after an address is assigned, packet data is moved to a next processing block together with the assigned address when the Used bit of the address remains enabled, and the validity bit is disabled when the packet data is of the kind that need not be traced; and the Used bit is disabled when detecting that a corresponding valid bit is to be disabled, and the address of the disabled Used bit is assigned to new packet data input.

6. A data transmission method as claimed in claim 5, wherein the receiving of the data having said header from said receive port includes assigning a sequence number to said data to be used as a starting address in said storing of the processing result.

7. A non-transitory computer readable medium storing a data transmission apparatus control program for causing a data transmission apparatus to execute a method comprising:

receiving data having a header from a receive port;

selecting a transmit port for transmitting out said data from a plurality of transmit ports based on information carried in said header;

determining based on said information whether said data are to be discarded, and performing processing for discarding said data if determined that said data are to be discarded;

storing said data in a transmit queue according to data priority if said data were not discarded;

storing, in a processing result memory, processing results and a corresponding validity bit, the processing results including a reception processing result from the receiving, a filtering processing result from the determining, and a queuing processing result from the storing of said data;

enabling a validity bit and an Used bit in an offered address and said storing includes storing the processing results of each processing block;

setting the corresponding validity bit for the processing results if the processing results are to be output; and outputting said data stored in said transmit queue to the transmit port selected, by appending said processing results to said data if said data were not discarded and the corresponding validity bit is enabled, and outputting said processing results to a secondary port if said data were discarded and the corresponding validity bit is enabled, and wherein after an address is assigned, packet data is moved to a next processing block together with the assigned address when the Used bit of the address remains enabled, and the validity bit is disabled when the packet data is of the kind that need not be traced; and the Used bit is disabled when detecting that a corresponding valid bit is to be disabled, and the address of the disabled Used bit is assigned to new packet data input.

* * * * *